UNITED STATES PATENT OFFICE.

CHARLES C. BEMIS, OF BRATTLEBOROUGH, VERMONT.

IMPROVEMENT IN PAINT COMPOSITIONS.

Specification forming part of Letters Patent No. 169,887, dated November 16, 1875; application filed September 10, 1875.

*To all whom it may concern:*

Be it known that I, CHARLES C. BEMIS, of Brattleborough, of the county of Windham, of the State of Vermont, have invented a new and useful Chemical Composition for mixture with an animal or vegetable oil, for the purpose of improving it as a lubricator for machinery or as a vehicle for a paint; and I do hereby declare the same to be fully described as follows:

The ingredients of it, and the proportions in which they may be used, are, (although I do not confine my invention to such proportions, as they may be somewhat varied without materially changing the result,) unslaked lime, seven hundred and sixty-eight pounds; sulphur, two pounds; muriate of ammonia, one pound; carbonate of ammonia, one pound; sal-soda, three pounds; bicarbonate of potash, one and one-half pound; borate of soda, one and one-half pound; forty gallons of water. The said composition I usually prepare as follows—that is to say, first, with a sufficient quantity of the water, the lime to be slaked, and the sulphur mixed with it, so that both may be acted on by the water at once, as by so doing they are converted to better advantage into a paste. Next, dissolve in five gallons of the water, at or about at a boiling temperature, the muriate and carbonate of ammonia and the sal-soda, and after this mix the slaked lime and the sulphur with the solution. Next, add to it the bicarbonate of potash, the borate of soda, and the remainder of the water, and stir the whole thoroughly together. Next, the solution is to be allowed to stand, so that the impurities or extraneous matters may settle or rise to the surface and be removed.

This composition, when used with an animal or a vegetable oil or fat, such as lard, linseed, olive, or seal oil, is to be mixed with it, in the proportions of one part by measure of each, or one part of the composition with two parts of the oil, the two forming a chemical oleaginous compound or liquid, highly useful as a lubricator, or as a vehicle for mixture with a pigment for use in painting a surface.

I claim as my invention—

The composition as described, for mixture with an animal or vegetable oil, such composition consisting of lime, sulphur, muriate and carbonate of ammonia, sal-soda, bicarbonate of potash, borate of soda, and water, substantially as specified.

CHARLES C. BEMIS.

Witnesses:
R. H. EDDY,
J. R. SNOW.